United States Patent [19]

Warshawsky

[11] Patent Number: 4,548,446

[45] Date of Patent: Oct. 22, 1985

[54] ARTICULABLE JOINT

[76] Inventor: Jerome Warshawsky, 3284 Bertha Dr., Baldwin Harbor, N.Y. 11510

[21] Appl. No.: 434,612

[22] Filed: Oct. 15, 1982

[51] Int. Cl.[4] .............................................. H02G 13/00

[52] U.S. Cl. .................................... 339/2 A; 285/185; 285/DIG. 8; 403/97

[58] Field of Search .............. 339/1 L, 2 L, 2 A, 5 P; 285/185, DIG. 8; 403/97

[56] References Cited

U.S. PATENT DOCUMENTS

| | | | |
|---|---|---|---|
| 478,417 | 7/1892 | Drew | 285/185 X |
| 1,697,710 | 1/1929 | Bostroem | 403/97 |
| 2,188,069 | 1/1940 | Walsh | 285/185 X |

*Primary Examiner*—Z. R. Bilinsky

*Attorney, Agent, or Firm*—Stephen E. Feldman

[57] ABSTRACT

A first substantially hollow, substantially hemispherical joint half is disposed adjacent a second substantially hollow substantially hemispherical joint half to form therewith a substantially spherical articulable joint. A tapered opening extends through the first joint half to receive the tapered end of a connecting pin and provide a frictional contact fit therewith. Spline like teeth are formed on the internal surface of an opening extending through said second joint half to receive spline like teeth also formed on said connecting pin to provide a sliding but not rotative fit therewith. A threaded fastener, received through said second opening and into the respective end of the connecting pin means when turned in a first predetermined direction draws in the connecting pin means to draw the joint halves together and provide a strong articulable joint with each half capable of rotating with respect to the other half about an axis through the connecting pin means.

8 Claims, 4 Drawing Figures

FIG. 1
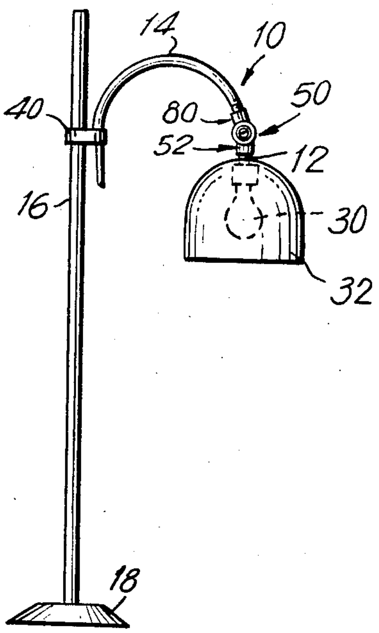
FIG. 2
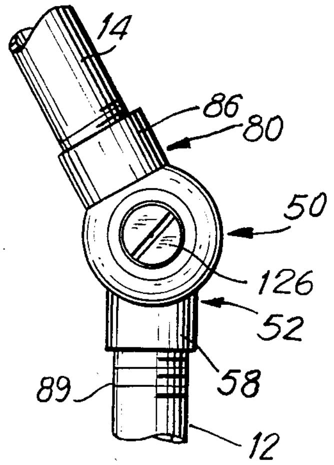
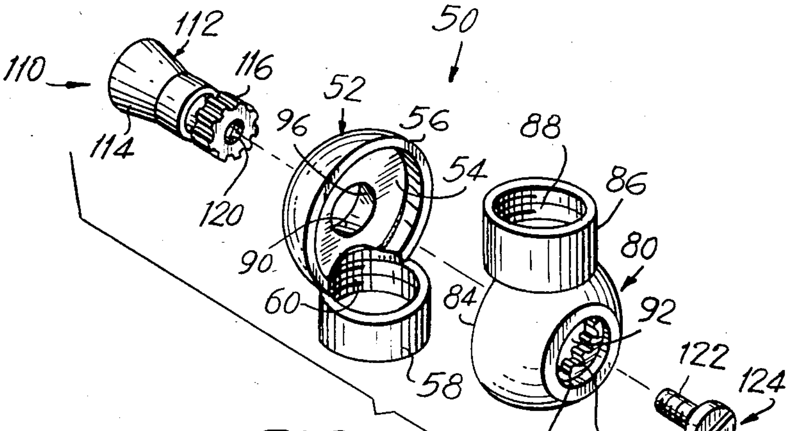
FIG. 3
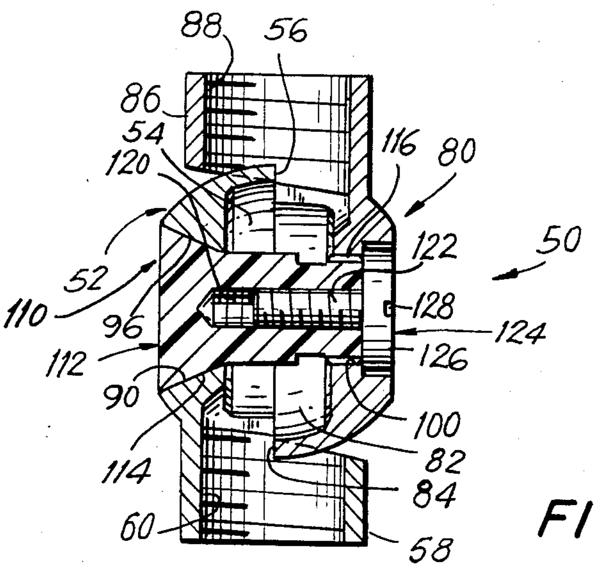
FIG. 4

ARTICULABLE JOINT

BACKGROUND OF THE INVENTION

1. Field of Application

This invention relates to articulable joints; and more particularly to joints articulable about only a single axis of rotation.

2. Description of the Prior Art

Articulable joints are utilized whenever two members are to be connected together so that the members can move with respect to each other. Some such joints are quite versatile permitting movement of the members with respect to each other, about plural axis of rotation; a first such axis of rotation, for example, passing through such members in a longitudinal direction; and a second such axis of rotation, for example, passing through such members in a transverse direction. However, the more versatile the joint, the more complex and costly it usually is. Complexitiy and cost of such articulable joints may increase even more if the joint is to permit a person to selectively move the members with respect to each other, while at the same time maintaining the members in position once so moved; especially if one or both of the members is relatively heavy, and/or if one of such members creates a relatively large moment about its axis of rotation.

Not all members which are to be joined together, so that the members can move with respect to each other, require a joint permitting rotation about multiple axes of rotation. If such members are to be joined so that movement about only one axis is sufficient the versatility, complexity and cost of multiple axes joints is most probably not warranted. A joint which facilitates selective movement about a single axis, and which retains the members in position when so moved, without the need for tools or a release and locking means, may still be required for particular applications. One such application is found in lamp and lighting fixtures.

Many lamps and lighting fixtures connect the lamp socket, into which the light bulb is screwed, to its carring member (an arm or pole) by way of a joint that permits movement of the lamp socket about an axis of rotation perpendicular to an axis passing through the lamp socket carrying member. Quite often the lamp socket is disposed in a bullet or globe like housing which is, in turn, connected to a carrying member by such a joint. Selective positioning of the housing, or bulb socket, of such units may require release of a locking device before being able to move the lamp unit, and subsequent tightening of the locking device after such movement if the lamp is to maintain its position. Quite often the locking device comprises friction type fittings which deteriorate with age and continued movement of the carrying unit, and releasing and tightening of the locking device.

SUMMARY OF THE INVENTION

It is therefore an object of this invention to provide a new and improved articulable joint.

It is another object of this invention to provide a new and improved joint articulable about only one axis of rotation.

It is yet another object of this invention to provide a new and improved articulable joint which maintains its position while permitting selective movement of the joined members with respect to each other.

It is yet still another object of this invention to provide a new and improved articulable joint for use with lamp and lighting units.

It is still a further object of this invention to provide a new and improved articulable joint for facilitating movement of a lamp carrying unit with respect to its mounting member.

It is yet still a further object of this invention to provide a new and improved articulable joint for interconnecting a lamp unit to its carrying member so as to permit selective movement of the lamp unit, with respect to its carrying member, about an axis of rotation perpendicular to an axis passing through the lamp unit.

It is yet still a further object of this invention to provide a new and improved articulable joint for interconnecting a lamp unit to its carrying member so as to permit selective movement of the lamp unit, and so as to maintain the lamp unit in position when so moved.

This invention involves an articulable joint for interconnecting two members to each other so as to permit movement of said members with respect to each other about a predetermined axis of rotation; and contemplates forming the joint of two joint halves held together by connecting pin means, which pass through the joint halves and which has frictional contact with a predetermined surface of one of the joint halves and an axially sliding, but rotationally fixed, fit with the other joint half. The connecting pin means includes tightening means for urging the two joint halves towards each other, and for permitting separation thereof; while each joint half is formed with a contact surface formed and disposed for positioning adjacent the respective surface of the other joint half, and so as to permit relative movement of one joint half with respect to the other, about an axis of rotation passing longitudinally through the connecting pin means.

Other objects, features, and advantages of the invention in its details of construction and arrangement of parts will be seen from the above, from the following description of the preferred embodiment when considered with the drawings and from the appended claims.

BRIEF DESCRIPTION OF THE DRAWING

In the drawing:

FIG. 1 is a side elevational view of a lamp incorporating the instant invention;

FIG. 2 is an enlarged showing of the articulable joint portion of the lamp of FIG. 1 showing the articulable joint thereof connecting the bulb holder to its support arm;

FIG. 3 is an exploded view of the articulable joint of FIGS. 1 and 2; and FIG. 4 is a still further enlarged vertical sectional view of the articulable joint of FIGS. 1, 2, and 3.

DESCRIPTION OF THE PREFERRED EMBODIMENT

For convenience, the invention will be described as applied to the articulable joint for interconnecting the bulb socket to a support arm for a base mounted electric lamp or lighting unit. The articulable joint is formed from two substantially hemispherical, substantially hollow, joint halves which are disposed with their flat sides adjacent each other to provide a substantially spherical joint. A passage, coaxial with an axis or rotation perpendicular to said flat sides, and passing through the center of the sphere, is formed to receive a plastic connecting pin, which in turn, receives a brass threaded fastener to hold the joint halves together. Internally threaded short tubular members are connected to each joint half for receiving externally threaded ends of the lamp members to be connected together.

It should be understood, nevertheless, that without departing from the scope of this invention: that the joint halves need not be hemispherical, but can be of any convenient configuration; that the joint halves need not be hollow; that the passage for the connecting pin means need not be perpendicular to surface along which the joint halves meet; that the connecting pin need not be plastic or the threaded fastener brass, but that either can be of other suitable materials; that the lamp, or lighting unit, may be mounted to a wall, pole or other suitable mount; that the means for connecting the joint halves to the members to be connected need not be internally threaded tubular members but can be of any suitable configuration; and that the articulable joint can be used to connect any suitable members of the lamp of for that matter any two members which are to be connected in an articulable manner.

With reference to FIG. 1, there is generally shown at 10 a lamp, or lighting unit, having a bulb socket 12 carried by a support arm 14 which is, in turn, secured to a support post 16 mounted on a lamp base 18. Bulb socket 12 receives a light bulb 30 and a shade 32 but can be positioned in a globe, bullet or other type housing if preferred. Lamp base 18 mounts lamp 10 on a table, desk, dresser, or other article of furniture but if support post 16 is long enough lamp base 18 can serve to mount lamp 10 on the floor.

Lamp base 18, support post 16, support arm 14, bulb socket 12, bulb 30 and shade 32 are of conventional construction and formed from suitable materials such as metal, wood, glass, plastic, ceramic and the like. Similarly a clutch unit 40, also of conventional construction, secures support arm 14 to support post 16. However, if preferred support arm 14 may be secured by clutch unit 40, or other suitable means, to an appropriate bracket for mounting bulb socket 12 to a wall or other such surface.

An articulable joint 50, (FIGS. 1-4) interconnects support arm 14 and bulb socket 12 so as to permit rotation of bulb socket 12 with respect to support arm 14 about a predetermined axis of rotation which, in this instance, is perpendicular to an axis through the longitudinal center of support arm 14. A first half 52, of articulable joint 50, is formed of substantially hemispherical configuration, with a hollow 54 inside, and with a contact edge 56. A short tubular end piece 58 is provided with internal threads 60 to receive external threads 89 of lamp socket 12 as shown (FIG. 2), or any other member to be connected by articulable joint 50. If preferred on otherwise suitably formed end piece, such as an externally threaded post or flat bracket, may be carried by first half 52 of articulable joint 50. A second half 80 (FIGS. 2, 3 & 4) of articulable joint 50, is also frmed of substantially hemispherical configuration with a hollow 82 (FIG. 4) inside, and with a contact edge 84 formed for surface to surface coaction with contact edge 56 of joint half 52. A short tubular end piece 86 is provided with internal threads 88 to receive external threads of support arm 14. End piece 84 of joint half 80 may be otherwise formed as explained above for joint half 52.

A passageway is formed through articulable joint 50 by providing a first opening 90 through joint half 52, and a second opening 92 through joint half 80 so as to be in axial alignment with opening 90. An inwardly tapered surface 96 is formed on first opening 90 as it passes through joint half 52; while the surface 98 of second opening 92 is formed by a plurality of inwardly pointing triangular teeth 100.

Connecting pin means 110 (FIG. 4) extends through the passageway formed by aligned openings 90 and 92 to connect joint halves 52 and 80 with their contact edges, 84 adjacent each other to form articulable joint 50. A pin portion 112 (FIG. 3), of connecting pin means 110, is formed at one end thereof with a surface 114 tapered to seat against tapered surface 96 of opening 90 of joint half 52. Triangular teeth 116 are formed at the other end of pin portion 112 for a sliding but non-rotative fit with triangular teeth 100 of second opening 92 of second joint half 80. An internally threaded opening 120 is formed into the toothed end 116 of pin portion 112 to receive the external threads 122 of a fastener 124 having a head 126 with a turning slot 128.

To assemble articulable joint 50 contact edge 56, of first joint half 52, is disposed against contact edge 84 of second joint half 80, and pin portion 112, of connecting pin means 110, is inserted through opening 90 of first joint half 52 and then through opening 92 of second joint half 80. The external threads 122 of fastener 124 are threaded into internally threaded opening 120, of pin portion 112, and a suitable tool, such as a screw driver blade (not shown) is inserted into slot 128 of head 126 and turned to draw joint halves 52 and 80 together. The mating triangular teeth 100 and 116 formed in opening 92 and on pin portion 112 respectively permit a non-rotative sliding fit for pin portion 112 within second joint half 80. At the same time the coacting tapered surfaces 96 of opening 90 and 114 of pin portion 112 allow joint halves 52 and 80 to be firmly drawn together.

The members which are to be connected together by articulable joint 50, such as support arm 14 and bulb socket 12, may be threaded into internally threaded end pieces 58, 86 of joint halves 52, 80 respectively either before joint halves 52, 80 are secured together as hereinabove described, or thereafter. If the members to be connected together are not susceptible of being formed with externally threaded ends then the end pieces of joint halves 52, 80 may be otherwise suitably formed. Once so connected together the members may be moved with respect to each other by merely moving one or the other such member so that each joint half rotates about the axis of rotation of connecting pin 110. The coaction of joint halves 52, 80 is such that the members should remain in their respective moved positions. However, if articulable joint 50 is too tight to permit such movement then one only need insert a screw driver blade in slot 128 of head 126 and turn same sufficiently to loosen articulable joint 50 just enough to permit the desired movement. Alternatively, if the members once so adjusted move out of their adjusted positions because articulable joint 50 is to loose, then fastener 124 need only be turned an amount sufficient to provide the desired degree of tightness between joint halves 52, 80.

If desired a suitable arm or lever may be formed on the head end of fastener 124 to facilitate turning same for the purpose of tightening or loosening fastener 124 and articulable joint 50.

From the above description it will thus be seen that there has been provided a novel and improved articulable joint which is relatively simple in construction and operation while being extremely effective to secure two members together for relative movement with respect to each other about a predetermined axis of rotation.

It is understood that although I have shown the preferred form of my invention that various modifications may be made in the details thereof without departing from the spirit as comprehended by the following claims.

In addition, it thus will be seen that there is provided an articulable joint which achieves the various objects of the invention, and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby, since the embodiments of the invention particularly disclosed and described herein above are presented merely as an example of the invention. Other embodiments, forms, and modifications of the invention, coming within the proper scope and spirit of the appended claims, will of course readily suggest themselves to those skilled in the art. Thus, while there has been described what is at present considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

I claim:

1. An articulable joint; comprising:

(a) a first joint half formed with a first contact surface;

(b) a second joint half formed with a second contact surface;

(c) said first contact surface and said second contact surface each being formed to be disposed one adjacent the other and so that said first joint half and said second joint half may be rotatively disposed adjacent each other;

(d) a passageway extending through said first joint half and said second joint half;

(e) connecting pin means extending through said passageway;

(f) said connecting pin means including fastening means for securing said connecting pin means in position in said passageway, and said joint halves in rotative position with respect to each other;

(g) said first joint half and at least a first portion of said connecting pin means being respectively formed for frictional engagement with each other; and (h) said second joint half and at least a second portion of said connecting pin means being formed for a sliding but non-rotative fit one with respect to the other;

(i) each of said joint halves having an internally threaded end piece, each of said end pieces being substantially concentric;

(j) said passageway being formed by providing a first opening through said first joint half and a second opening through said second joint half and so as to be aligned with said first opening;

(k) said first opening being formed with its entire surface tapered and said first portion of said connecting pin means being formed with a corresponding tapered surface; and (l) said second opening being formed with its entire surface toothed and said second portion of said connecting pin means being formed with external teeth formed for mating engagement with said toothed inner surface to provide said sliding non-rotative fit.

2. The articulable joint of claim 1; wherein:

(a) first connecting means are provided for said first joint half to connect same to the first one of two members to be connected together; and (b) second connecting means are provided for said second joint half to connect same to a second one of two members to be connected together.

3. The articulable joint of claim 2: wherein the first member and the second member to be connected together are respectively members of a lamp that are to be connected together for movement one with respect to the other.

4. The articulable joint of claim 3: wherein said first connecting means and said second connecting means are each respectively internally threaded short tubular members each secured to its respective joint half.

5. The articulable joint of claim 3: wherein said first member constitutes a lamp bulb socket and said second member constitutes a support arm from which said lamp bulb socket is to be rotatively supported.

6. The articulable joint of claim 3: wherein said joint halves are formed of a suitable metal and said connecting pin means is formed of a suitable plastic.

7. The articulable joint of claim 5: wherein said first joint half and said second joint half are each formed to a substantially hollow, substantially hemispherical configuration.

8. The articulable joint of claim 3: wherein said passageway extends through said first joint half and said second joint half along an axis that is perpendicular to said contact surfaces.

* * * * *